United States Patent [19]

Ruchser et al.

[11] Patent Number: 4,565,209
[45] Date of Patent: Jan. 21, 1986

[54] PRESSURE REGULATING VALVE WITH FEEDBACK CONTROL

[75] Inventors: Erich Ruchser, Kernen; Helmut Ott, Stuttgart, both of Fed. Rep. of Germany

[73] Assignee: Herion-Werke KG, Fed. Rep. of Germany

[21] Appl. No.: 578,661

[22] Filed: Feb. 9, 1984

[30] Foreign Application Priority Data

Feb. 14, 1983 [DE] Fed. Rep. of Germany ....... 3305092

[51] Int. Cl.$^4$ ............................................. G05D 16/10
[52] U.S. Cl. .................................. 137/116.3; 137/492; 137/627.5; 251/30.01
[58] Field of Search ................. 137/116.3, 116.5, 627.5

[56] References Cited

U.S. PATENT DOCUMENTS

| 2,783,769 | 3/1957 | Philbrick | 137/116.5 |
| 3,071,147 | 1/1963 | Dudzinski | 137/116.5 |
| 4,071,042 | 1/1978 | Lombard | 137/116.3 X |
| 4,117,865 | 10/1978 | Beck | 137/627.5 |
| 4,452,267 | 6/1984 | Ott | 137/116.5 |

FOREIGN PATENT DOCUMENTS 1298677 12/1972 United Kingdom ............ 137/116.3

*Primary Examiner*—Robert G. Nilson
*Attorney, Agent, or Firm*—Jordan B. Bierman

[57] ABSTRACT

The invention relates to a pressure regulating valve for pneumatic and hydraulic pressure media wherein a higher primary pressure is regulated to a desired lower secondary pressure. The valve comprises a primary connection, a secondary connection and a relief connection, there being a switch valve between the primary connection and the secondary connection, a relief valve between the secondary connection and the relief connection, and a control connection for controlling the operation of the valve in response to an external controlled quantity. The controlled quantity may be the secondary pressure output of the valve, or may be another pressure or a mechanical displacement of a larger system.

8 Claims, 7 Drawing Figures

PRESSURE REGULATING VALVE WITH FEEDBACK CONTROL

The invention relates to a pressure regulating valve for pneumatic and hydraulic pressure media of the type having a housing with a primary connection, secondary connection and relief connection, a switch valve between the primary connection and the secondary connection, and a relief valve between the secondary connection and the relief connection.

BACKGROUND OF THE INVENTION

Pressure regulating valves of the aforementioned type serve to reduce a higher primary pressure at the primary connection to a lower secondary pressure at the secondary connection through the characteristics of the relief valve. However, valves of the aforementioned type do not have the capability of being directly controlled in response to variables other than the level of the secondary pressure. For example, it may be desirable to provide direct control of the pressure regulating valve in response to pressures in the system being regulated or the mechanical displacement of a load.

Accordingly, it is a principal object of the invention to provide a pressure regulating valve with a control connection for feedback of a controlled variable or quantity. Further objects of the invention are to provide a controlled connection wherein the controlled quantity may be a system pressure or a mechanical displacement, and to implement the pressure regulating valve in a system as a feedback control.

SUMMARY OF THE INVENTION

In accordance with the invention, a pressure regulating valve for pneumatic and hydraulic pressure media comprises a housing with a primary connection, a secondary connection and a relief connection; there is a switch valve between the primary connection and the secondary connection, a relief valve between the secondary connection and a relief connection, and means including a control connection for controlling the operation of the pressure regulating valve in response to an external variable. In the preferred embodiments of the invention, the control means includes a control piston which is actuated in response to an external variable that may be a pressure of the system being regulated or a mechanical displacement of a load. The relief valve includes a valve disc biased in one direction by a control magnet; the control piston is coupled by a stem or a push-rod to the valve disc of the relief valve. In particular embodiments, the push-rod is made integral with the valve disc or with the control piston, and it extends through a hollow valve piston of the switch valve. The valve piston and control piston may be connected to the housing with bellows or with low-friction diaphragm seals.

The pressure regulating valve of the invention is intended to be incorporated in a controlled system comprising a main hydraulic body or a larger regulating valve. The output of the secondary connection is arranged as a control input for the system, and a variable of the system, such as its output pressure or an output mechanical displacement, is arranged to provide the feedback for the control connection of the pressure regulating valve.

BRIEF DESCRIPTION OF THE DRAWINGS

The above and further features of the invention are described in detail below in conjunction with the drawings of which.

DETAILED DESCRIPTION OF THE INVENTION

Figure 1:
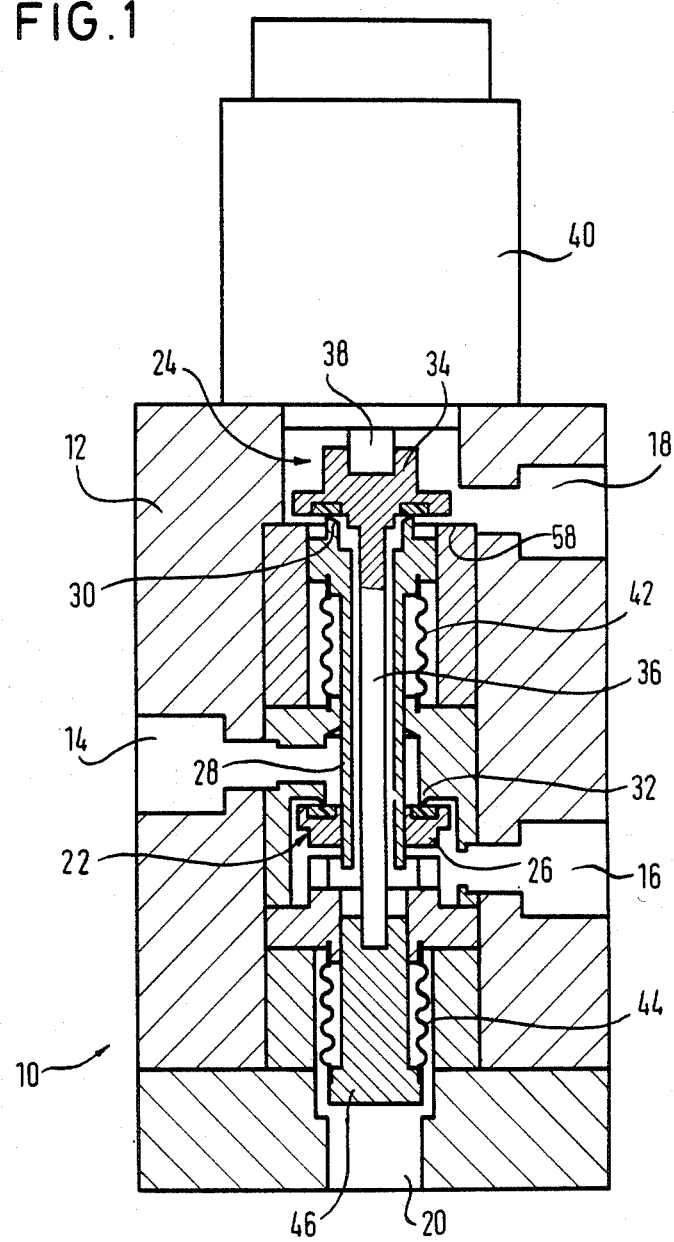
FIG. 1 is a schematic, cross-sectional view of a pressure regulating valve in accordance with the invention having a control connection for an external pressure variable.

The following is a description of the preferred embodiments of the invention, as illustrated in the drawings, and is not intended to limit the scope of the invention.

Referring to FIG. 1, pressure regulating valve 10 comprises housing 12 having primary connection 14 for a pressure medium under a high primary pressure, e.g., air or other fluid, secondary connection 16 for providing an output regulated to a secondary pressure lower than the primary pressure, and relief connection 18 which is used to vent excess pressure in order to maintain the desired secondary pressure. The pressure regulating valve has control magnet 40 for establishing a desired setting for the secondary pressure and, further, control connection 20 for controlling the operation of the pressure regulating valve in response to an external variable.

Switch valve 22 is provided between primary connection 14 and secondary connection 16, and relief valve 24 is arranged between secondary connection 16 and relief connection 18. Guided axially displaceably in housing 12 is valve piston 28, the lower end of which is secured to valve disc 26 of switch valve 22. Valve disc 26 together with valve seat 32 forms switch valve 22 in housing 12. Valve disc 26 may be mounted for axial adjustment with respect to valve piston 28, e.g., threaded onto valve piston 28. The threading is sealed in a suitable manner, not shown in the drawings, and means may be further provided for fixing valve disc 26 on valve piston 28 in a set position.

Valve piston 28 is provided at its upper end with valve seat 30 which cooperates with valve disc 34 to form relief valve 24. Valve disc 34 is adapted to be biased in the closed direction of relief valve 24 under the action of control pin 38 of control magnet 40.

Control piston 46 is arranged to be axially displaceable with respect to control connection 20, and is coupled by push-rod 36 to valve disc 34 of the relief valve.

The stem or push-rod 36 is shown in the embodiment of FIG. 1 as being integral with valve disc 34. It is connected in a suitable manner, e.g., by threading, to control piston 46, or it may also be made integrally with control piston 46. Push-rod 36 extends axially through a hollow bore in valve piston 28.

Valve piston 28 and control piston 46, as shown in FIG. 1, are connected by bellows 42 and 44, respectively, in sealing engagement to housing 12. Preferably, the effective diameters of bellows 42 and 44 are equal to each other and, furthermore, are equal to the effective diameters of the two valves 22 and 24. Thus, valve piston 28, valve disc 34, and control piston 46 are isolated from other pressures within the housing.

the operation of the pressure regulating valve shown in FIG. 1 is as follows. A pressure medium under high primary pressure is supplied as an input at primary connection 14. Switch valve 22 and relief valve 24 are initially closed, i.e., the pressure regulating valve is within the desired pressure range determined by control magnet 40, and the desired secondary pressure is maintained in secondary connection 16. The feedback or return input from an external controlled variable is supplied at control connection 20. The controlled variable may be the secondary pressure from secondary connection 16 or, in particular, it may be a pressure or a mechanical displacement which is monitored directly from the load or system being regulated, as will be further described with reference to FIGS. 5–7.

The biasing force set at control magnet 40 acts on valve disc 34 of the relief valve in the closed direction, while, in the opposite direction, a force acts on valve disc 34 which is the product of the pressure of the control medium at control connection 20 and the effective area of control piston 46. This force is transmitted to valve disc 34 by push-rod 36. If these forces are in equilibrium, the pressure regulating valve assumes the position shown in FIG. 1 in which, as previously mentioned, switch valve 22 and relief valve 24 are closed.

If a higher secondary pressure is now required, the force of control magnet 40 can be increased, whereby the pressure regulating valve will no longer be in equilibrium. By the displacement of valve disc 34 and valve piston 28, valve disc 26 is lifted from its valve seat 32, and the switch valve is thus opened. Valve disc 34 can move downwards until it meets stop 58 in housing 12. Once switch valve 22 has opened, the pressure medium flows from primary connection 14 to secondary connection 16 until the secondary pressure has increased to the level determined by control magnet 40. When this level is reached, the forces are again in equilibrium and switch valve 22 again closes. The pressure regulating valve then again assumes the position shown in FIG. 1.

If a lower secondary pressure is desired, the force of control magnet 40 acting on valve disc 34 is reduced accordingly. For the embodiment shown, wherein the variable at control connection 20 is the secondary pressure from secondary connection 16, a force is applied by control piston 46 and push-rod 36 to valve disc 34 in the opening direction and lifts it from valve seat 30, and relief valve 24 is thus opened. The pressure medium as a result flows from secondary connection 16 to relief connection 18 until the equilibrium of the forces is again achieved, i.e., until the force exerted by control piston 46 on valve disc 34 corresponds to the new force set at control magnet 40. The desired lower secondary pressure is thus obtained at secondary connection 16.

In the above description of the embodiment of FIG. 1, control connection 20 communicates with the output from secondary connection 16 such that the controlled variable at connection 20 is the secondary pressure. However, this need not necessarily be the case, and instead of the secondary pressure, control piston 46 can be subjected to another pressure or another force that is the controlled quantity, as will be explained further below.

Figure 2:
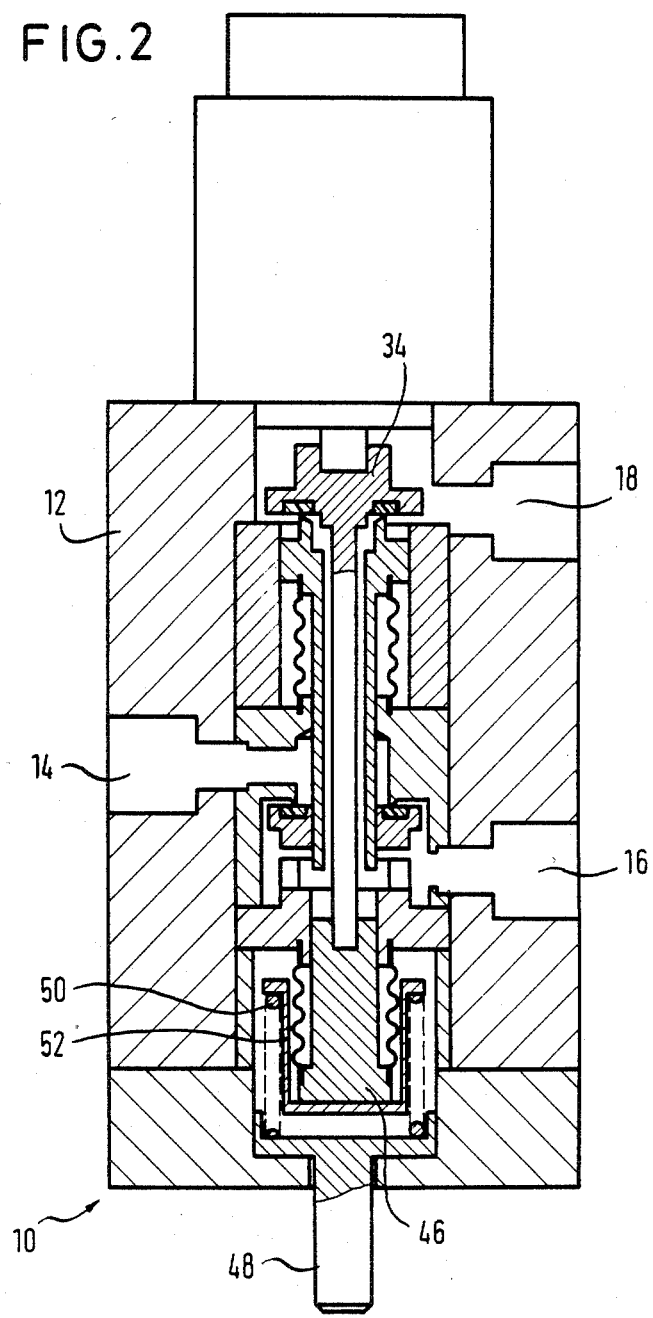
FIG. 2 is a schematic, cross-sectional view of the pressure regulating valve having a control connection for feedback from an external mechanical variable.

In the embodiment shown in FIG. 2, control piston 46 is subjected to the action of a mechanical displacement, rather than a pressure medium. This is obtained with the aid of push member 48 which is introduced into the control connection and acts on control piston 46 through pressure spring 50 and flanged bushing 52. Thus, for example, if push member 48 is displaced in the direction towards control piston 46, spring 50 is compressed to a greater degree, and the spring force is transmitted through bushing 52 to control piston 46 which, as previously described with reference to FIG. 1, then transmits this force to valve disc 34. In other respects, the pressure regulating valve shown in FIG. 2 corresponds to that in FIG. 1.

Figure 3:
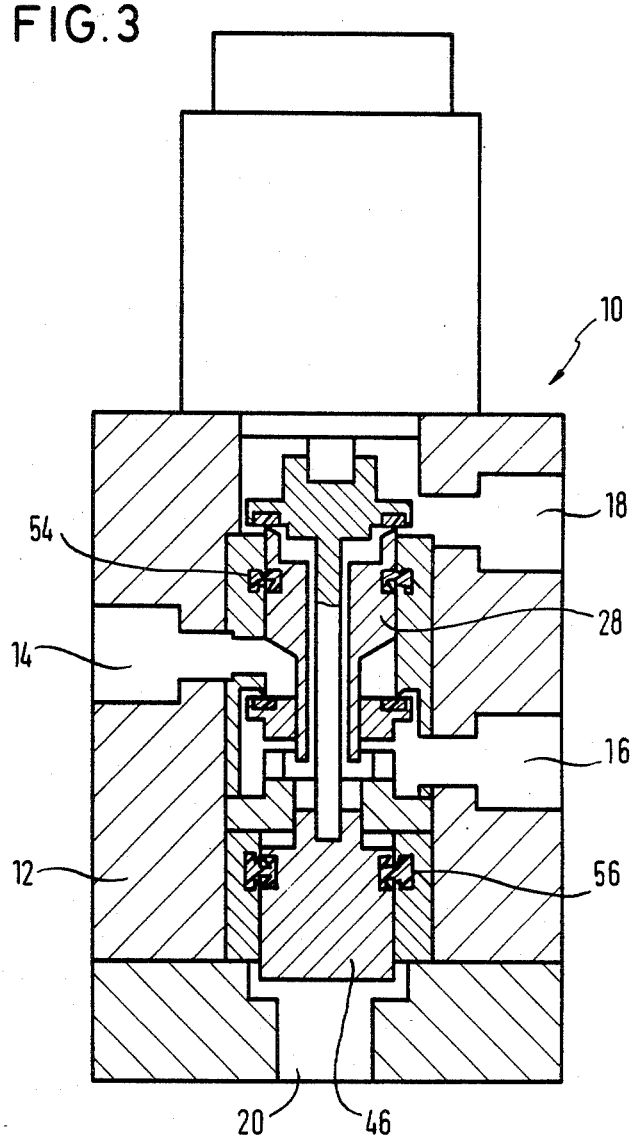
FIG. 3 is a schematic, cross-sectional view of the pressure regulating valve of FIG. 1 using low-friction diaphragm seals.

In the embodiment of FIG. 3, control piston 46 is subjected to the action of a pressure medium, i.e., gas or fluid, as in the embodiment of FIG. 1. However, in this case, instead of bellows 42 and 44 between valve piston 28 and control piston 46 and the housing, low-friction diaphragm seals 46 and 56 are used. The diaphragm seals are disposed in annular grooves formed in the housing walls and, correspondingly, in valve piston 28 and control piston 46.

Figure 4:
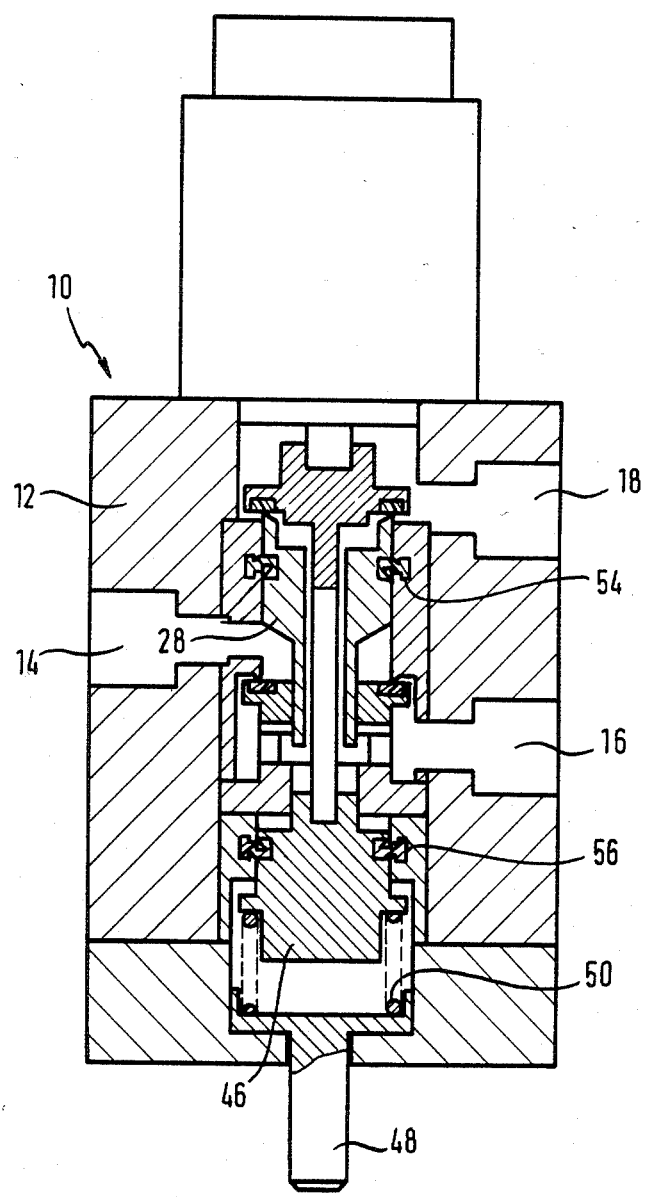
FIG. 4 is a schematic, cross-sectional view of the pressure regulating valve of FIG. 2 using low-friction diaphragm seals.

The embodiment of FIG. 4 corresponds to that of FIG. 2, i.e., control piston 46 is subjected to a mechanical action by push member 48, and pressure spring 50 is arranged directly between push member 48 and control piston 46. In this case, instead of bellows 42 and 44, diaphragm seals 54 and 56 are used as explained for the embodiment of FIG. 3.

Figure 5:
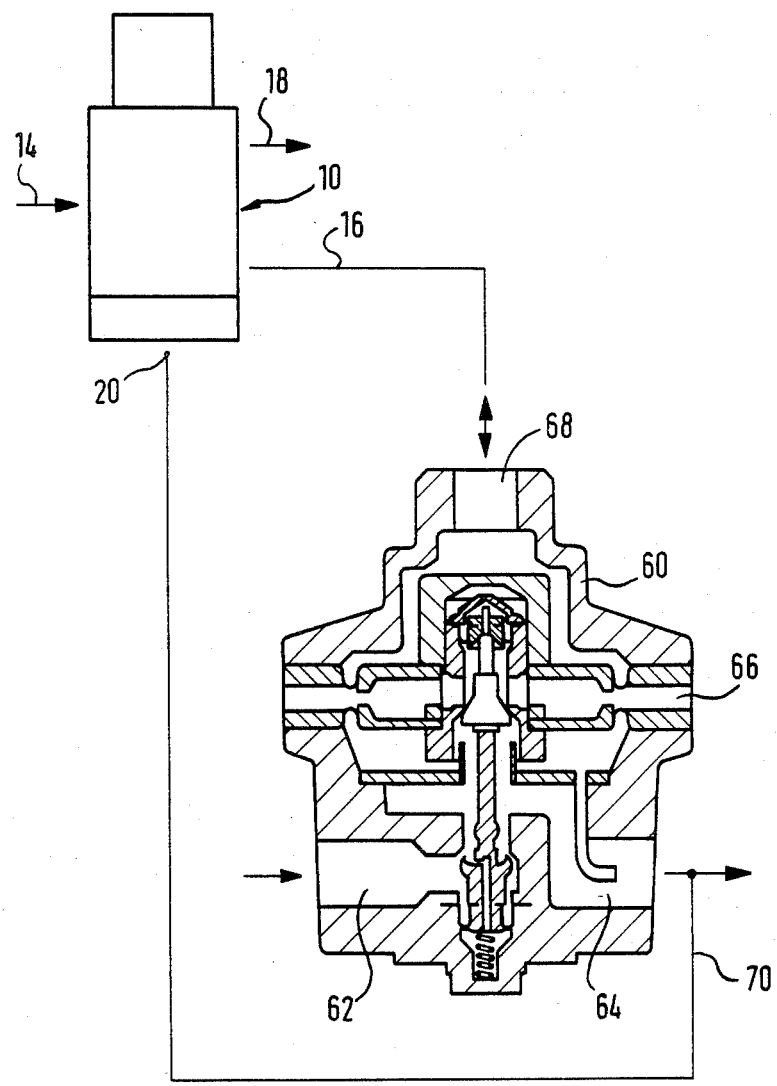
FIG. 5 is a schematic illustration of the pressure regulating valve in accordance with the invention used for controlling a larger regulating valve.
Figure 6:
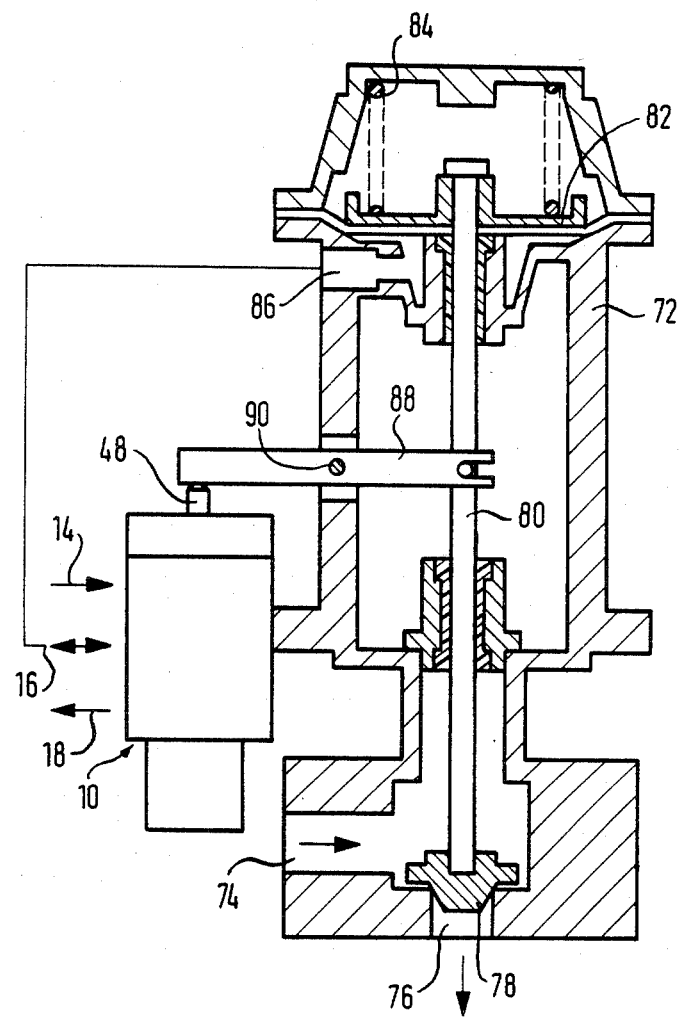
FIG. 6 is a schematic view of the pressure regulating valve incorporated in a hydraulic system using a mechanical variable as feedback for the control connection.
Figure 7:
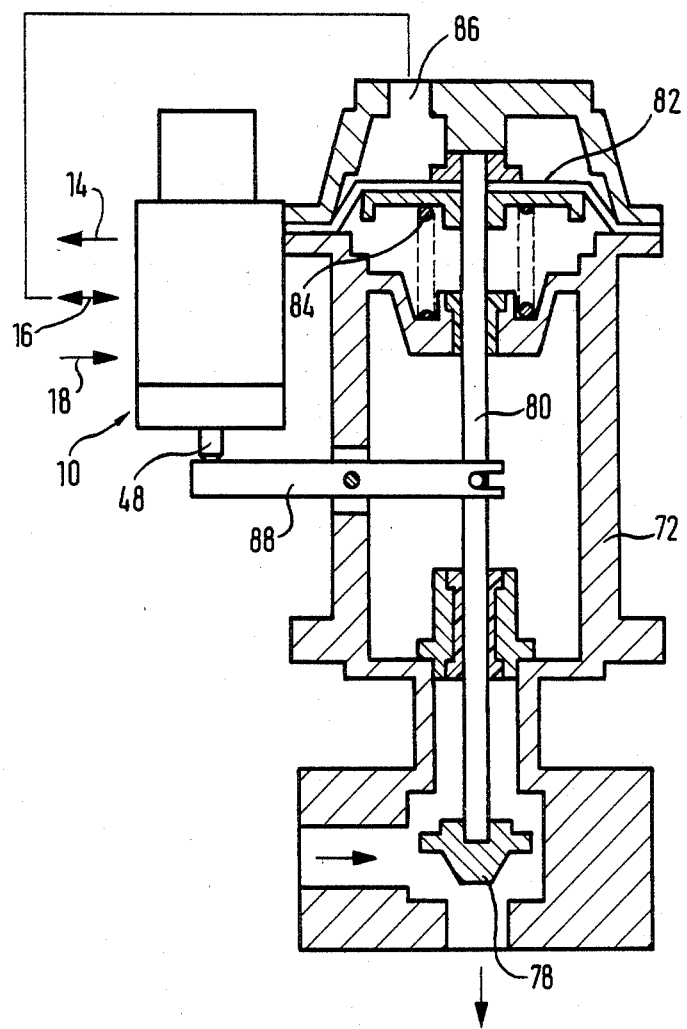
FIG. 7 is a schematic view of the hydraulic system of FIG. 6 arranged for a normally-open operation.

FIGS. 5–7 show examples of uses of the pressure regulating valve of the invention to regulate a hydraulic system or a larger regulating valve. In FIG. 5, the pressure regulating valve 10 is used as a pilot valve for a larger regulating valve 60. Regulating valve 60 has inlet connection 62, load connection 64, relief connection 66 and control connection 68. Regulating or control valves of this type are well-known and consequently valve 60 and its function will not be described in further detail here.

Regulating valve 60 regulates the primary pressure applied at inlet connection 62 to result in a desired outlet pressure at load connection 64. Control connection 68 of regulating valve 60 is connected to secondary connection 16 of pressure regulating valve 10 according to the invention. Control connection 20 is directly connected through conduit 70 to load connection 64 of regulating valve 60, instead of to secondary connection 16 as previously described with respect to FIG. 1. The controlled quantity or variable is thus the output pressure obtained at load connection 64 of valve 60. This pressure in employed directly as the control pressure at connection 20 of the presssure regulating valve 10, and has the advantage of eliminating the hysteresis effects of regulating valve 60. By this arrangement, only the hysteresis of pilot valve 10 remains, whereas with conventional controls of this type, in which the output pressure is controlled at control connection 68, there is a total hysteresis equal to the sum of the hysteresis of pilot valve 10 and the hysteresis of regulating valve 60.

In the embodiment of FIG. 6, a hydraulic control fitting 72 is governed by the pressure regulating valve 10 previously described with respect to FIG. 2. Control fitting 72 comprises a housing with inlet connection 74 and load connection 76. A primary pressure is supplied at inlet connection 74, and a secondary pressure to be regulated is obtained at load connection 76. The flow from connection 74 to 76 is controlled by valve piston 78 which is connected by valve push-rod 80 to diaphragm 82. Diaphragm 82 is biased by pressure spring 84 in the closed direction of valve piston 78. The secondary connection 16 of the pressure regulating valve 10 is connected to control connection 86 of control fitting 72, so that diaphragm 82 is subjected to the secondary pressure of pressure regulating valve 10 in the opening direction of valve piston 78 against the force of spring 84. Valve push-rod 80 is connected to one end of a two-armed lever 88 which is pivotally mounted at 0.90, and its other end is coupled to push member 48 of pressure regulating valve 10.

Thus, for example, when valve push-rod 80 is moved upwardly in FIG. 6, and valve 78 is thus opened, this movement is transmitted by lever 88 directly to push member 48 of the pressure regulating valve 10. The controlled variable in this case is the travel of valve push-rod 80, and a direct feedback is thereby provided to control piston 46. This has the advantage, for example, that the friction occurring in control fitting 72, e.g., the friction between valve push rod 80 and the seals, has no influence through hysteresis effects on the control of the system.

FIG. 7 shows a further modification of control fitting 72 of FIG. 6, the difference being that diaphragm 82 is subjected to the action of pressure spring 84 in the opening direction of the valve so that the valve is acted on in the closing direction by the pressure at control connection 86 against the force of spring 84.

Although this invention is described with reference to the above-specified elements, steps, and structural arrangements, it should be understood that a variety of modifications are possible without departing from the spirit or scope of this invention. All such modifications are intended to be included within the invention as defined in the following claims.

What is claimed is:

1. A pressure regulating valve for pneumatic and hydraulic pressure media comprising a housing having a primary connection, a secondary connection and a relief connection, a switch valve between the primary connection and the secondary connection, a relief valve between the secondary connection and the relief connection comprising a valve disc biased in one direction by a control magnet, and coupled by a push-rod to a control piston, and a control connection for controlling the operation of the pressure regulating valve in response to an external variable, said control piston disposed in the control connection adapted to be acted upon by the external variable and said switch valve includes a valve piston having a hollow bore therein, and said push-rod extends through said hollow bore between said control piston and said valve disc of said relief valve.

2. The pressure regulating valve according to claim 1, wherein the external variable is the pressure of a pressure medium.

3. The pressure regulating valve according to claim 1, wherein the external variable is a means for mechanical displacement.

4. The pressure regulating valve according to claim 1, wherein said valve piston is connected by a first bellows to the housing and said control piston is connected by a second bellows to the housing, and the effective diameters of said bellows are equal to each other and to the effective diameters of said switch valve and said relief valve.

5. The pressure regulating valve according to claim 1, wherein said valve piston and said control piston are arranged in sealing engagement with said housing by low-friction diaphragm seals.

6. The pressure regulating valve according to claim 1, wherein said push-rod is made integral with said valve disc or said control piston.

7. The pressure regulating valve according to claim 1, wherein said external variable is an output pressure from said secondary connection.

8. The pressure regulating valve according to claim 1 wherein said valve piston extends between said switch valve and said relief valve.

* * * * *